June 13, 1972  J. A. SEINER  3,669,729
METHOD FOR PRODUCING ARTICLES HAVING PIGMENTED COATINGS
WITH IMPROVED HIDING ABILITY AND THE RESULTANT PRODUCT
Filed June 22, 1970

INVENTOR
JEROME A. SEINER

BY  *Chisholm and Spencer*
ATTORNEYS 3,669,729
METHOD FOR PRODUCING ARTICLES HAVING PIGMENTED COATINGS WITH IMPROVED HIDING ABILITY AND THE RESULTANT PRODUCT
Jerome A. Seiner, Pittsburgh, Pa., assignor to PPG Industries, Inc., Pittsburgh, Pa.
Continuation-in-part of applications Ser. No. 741,502, July 1, 1968, and Ser. No. 745,433, July 17, 1968. This application June 22, 1970, Ser. No. 48,999
Int. Cl. C09d 3/48
U.S. Cl. 117—161 UA
17 Claims

ABSTRACT OF THE DISCLOSURE

The disclosed invention relates to improved opaque films which are continuous, microcellular and non-porous possessing unusual hiding ability and opacity. The films of this invention are prepared from a novel latex mixture comprising: non-elastomeric polymeric material, water, non-solvent for the polymeric material in a weight ratio of non-solvent to polymer solids of about 0.05 to about 3:1.0 and an opacifying pigment in a weight ratio of pigment to polymer solids of from about 0.1 to about 5:1. The non-solvent is selected such that it has a boiling point range above that of water and having sufficiently low volatility to remain entrapped in the polymeric matrix when the composition has reached a quasi-rigid or tack-free state when applied as a film. Once the film has become tack-free the non-solvent is evaporated so as to leave behind minute, closed cells which enhance the hiding and opacity of the film. The disclosed invention also relates to opaque films with enhanced optical properties produced by the inclusion of colored pigments, dyes, fluorescent materials and optical brighteners in the unusually opacified films in such a manner as to maximize their effectiveness therein.

CROSS-REFERENCE TO RELATED APPLICATIONS

This application is a continuation-in-part of my copending applications, Ser. No. 741,502, filed July 1, 1968; and Ser. No. 745,433, filed July 17, 1968.

BACKGROUND OF THE INVENTION

Various techniques for rendering polymeric films opaque have been developed in the past. Each of these techniques seek to optimize optical opacity in its own way. For example, opaque films are most conventionally prepared by adding a pigment which acts as an opacifying agent to a solution of a film forming material which would otherwise be colorless or transparent when cast in a film. As will be more fully explained hereinafter, the amount and size of the pigment particles generally are felt to be the criteria for optimum opacity.

Optical opacity, for example, the hiding power of a paint film as referred to hereinafter, is achieved either by absorption of the incident light or by scattering of the incident light, or a combination of these two. Thus, black is opaque because it absorbs the light incident on it and white is opaque because it back scatters the incident light. Light is either absorbed or scattered before it can reach the substrate. The ideal white pigment then is one which has zero absorption and maximum scattering.

Absorption depends primarily on the electronic structure of the molecule, as well as on the pigment particle size relative to the wave length of light. Scattering depends on the relative refractive indices of pigment and vehicle as well as on the particle size of the pigment relative to the wave length of incident light.

One simple description of the relation of the scattering and absorption to the resulting reflectance is that of Kubelka and Munk. At complete hiding, the following equation applies:

$$\frac{(1-R\infty)^2}{2R\infty} = \frac{K}{S} \quad \text{(Equation 1)}$$

wherein $R\infty$ is reflectance of a film so thick that a further increase in thickness does not change the reflectance, $K$ is the absorption coefficient and $S$ is the Kubelka-Munk scattering coefficient. No account is taken of the surface reflectance, and the equation applies only to internal reflectance.

The fractions contributed by more than one pigment in a system are additives as shown by the following equation:

$$\frac{(1-R)^2}{2R} = \frac{C_1 K_1 + C_2 K_2 + C_3 K_3 \ldots}{C_1 S_1 + C_2 S_2 + C_3 S_3 \ldots} \quad \text{(Equation 2)}$$

wherein $C_1$, $C_2$ and $C_3$ refer to the concentrations of pigents 1, 2, 3, etc.

When hiding is incomplete, the following equation applies:

$$R = \frac{1 - Rg(a - b \text{ ctgh } bSX)}{a - Rg + b \text{ ctgh } bSX} \quad \text{(Equation 3)}$$

where $R$ is the resulting internal reflectance, $Rg$ is the reflectance of the substrate, $a$ is equal of $(S+K)/S$, $b = (a^2-1)^{1/2}$, $S$ is the scattering coefficient, $X$ is the thickness of the film in mils, and ctgh refers to hyperbolic cotangent.

The Kubelka-Munk scattering coefficient may be computed from the following equation:

$$SX = \frac{1}{b} Ar \text{ ctgh } \frac{1 - aR_0}{bR_0} \quad \text{(Equation 4)}$$

where $Ar$ ctgh refers to the inverse hyperbolic cotangent, $R_0$ is the reflectance over a black substrate, of 0% reflectance, $a$ may be found from the relation, $$a = \frac{1}{2}\left[R + \frac{R_0 - R + Rg}{R_0 Rg}\right]$$

and $b$ is determined as above. In this equation, $R$ equals reflectance over a white substrate and $Rg$ is reflectance of the substrate which is coated; or $a$ may be found from the following equation:

$$a = \frac{1}{2}\left[\frac{1}{R}\infty + R\infty\right]$$

$K$ may be found from the equation $K = S(a-1)$.

The Kubelka-Munk analysis is discussed in further detail by D. B. Judd in "Color in Business, Science and Industry," John Wiley and Sons, New York, 1952, pp. 314–338; and by D. B. Judd and G. Wyszecki in "Color in Business, Science and Industry," 2nd Edition, John Wiley and Sons, New York, 1963, pp. 387–413, the disclosures of which are incorporated herein by reference.

Various techniques have been developed in the art for preparing opaque films which rely for opacity upon the presence of a large number of voids in the films. Such may be prepared for example, by depositing a film from an emulsion, e.g. either an oil-in-water or a water-in-oil emulsion. When a water-in-oil emulsion is used—i.e., one in which minute droplets of water are dispersed in a continuous phase of a film forming material—the emulsion is deposited as a coating and the organic solvent which comprised the continuous phase of the emulsion is evaporated therefrom. This causes gelation of the film forming material and entrapment of the dispersed water droplets. The water is then evaporated leaving microscopic voids throughout the film structure.

When the oil-in-water emulsion is used, the mechanism for forming the film is similar to that described above. A film forming material is dissolved in water. Thereafter, an organic liquid which is a non-solvent for the film former and which is not miscible with water is emulsified in the aqueous phase. The emulsion is formed into a thin layer and the water is evaporated causing the film forming material to gel and entrap minute droplets of the organic liquid. This liquid is then evaporated to cause minute voids in the film structure.

Another technique for obtaining porous, opaque, non-pigmented films is by preparing an aqueous dispersion of a film forming polymer containing a water soluble organic solvent in an amount which is sufficient to dissolve the polymer. A film is then formed from this aqueous dispersion and water is evaporated causing entrapment of minute droplets of the organic solvent in the polymer. The film obtained is then washed to dissolve the entraped minute droplets of solvent and the film is dried.

Still another technique for obtaining porous, opaque, non-pigmented films is set forth in U.S. Pat. No. 2,961,334. Basically, this process contemplates adding a polymeric material to a liquid solvent to thereby form a solution or a quasi-solution (i.e., as by peptizing). To this continuous phase is added a liquid which has a higher boiling point than the liquid solvent and which is a non-solvent for the film forming polymeric materials. The resulting emulsion is then applied to a substrate whereupon an opaque film is formed after first evaporating the water and then the non-solvent.

Various techniques have also been developed to modify latex compositions by the addition of a liquid non-solvent for the polymeric material of the latex. One such technique is disclosed in U.S. Pat. No. 3,092,601. This patent discloses a unique method for preparing self-induced three-dimensional patterns from coating compositions containing a polyvinyl acetate latex, a pattern forming agent (which is a non-solvent for the polymeric material) and various additives. In addition, there may be added a small amount of a pigment or non-leafing metallic powder. Although it is disclosed that the polyvinyl acetate may be modified by copolymerization with up to 20% of another vinyl monomer, or plasticized with a suitable plasticizer, the compositions of the disclosed invention are always those which do not coalesce well at room temperature, in order to obtain the desired self-induced three-dimensional patterns. Therefore, the pattern forming agent which is usually a non-solvent for the polyvinyl acetate polymer acts only as a pattern forming agent and not as a void forming agent which would produce opaque films since the polymeric material would not coalesce enough to entrap sufficient amounts of non-solvent to enable the resulting coating to become opaque upon the later removal of the non-solvent.

Another technique which was recently disclosed in U.S. Pat. No. 3,445,272, relates to the preparation of porous elastomeric coatings from a suspension of a latex of elastomeric polymers containing a water immiscible liquid which is a non-solvent for the elastomeric polymer. The composition is applied as a coating and the water and non-solvent are evaporated to leave behind small open cell pores in the resulting coating. While the open cell porous coatings have significant utility when used for shoe uppers, battery separators and the like, it is generally not desirable to employ a highly permeable coatings as a protective paint.

Although the above described techniques have proved useful in producing coatings or films which accomplish certain results, no techniques have been disclosed for obtaining as a paint a non-porous, microcellular coating which is continuous and possesses superior and unusual opacity and hiding power.

Furthermore, the process above-described which starts with an aqueous dispersion (i.e., a latex), rather than a solution or quasi-solution of the polymer uses a water-soluble polymer solvent for the pore forming ingredient. This polymer solvent must ultimately be washed away leaving an open celled structure. The problems attendant with such a solvent process are well known in the art. For example, the process is limited to the use of polymer solvents which are also water soluble. This condition removes a degree of flexibility from the operation. The washing steps, as another example, add an expense to the process. Further difficulties arise in the formation of open cells since such cells result in high permeability of the final film. Although convenient for some purposes, high permeability is undesirable for many film applications especially in the area of water repellents and sealing paints.

In summarizing the above-described processes for forming opaque films, it may be stated that those processes which contemplate the formation of closed cells in a film generally use the opacifying technique of evaporation to remove the discontinuous phase liquid from the film to thereby prevent rupture of the cells and maintain their closed integrity while at the same time rendering the film opaque. Preferably, the discontinuous phase liquid used is one which will permeate readily through the polymer matrix of the film so that evaporation may be achieved easily and economically. In many processes which envision the eventual formation of open cells or voids, a washing step must be used to wash-out or extract the discontinuous phase liquid from a film and thereby opacity it.

Many of the above-described processes assume the use of good film formers or soluble film formers in order to obtain their desired results. Thus, in this respect, all of the processes are relatively inflexible in their application since many desirable polymers which are not good film formers or which are not soluble film formers at normal temperatures are thereby eliminated from use.

It is known that each polymer has its own "glass transition temperature" (Tg). This term is well known in the art and is generally used to define or describe a temperature above which the polymer has acquired sufficient thermal energy for molecular rotational motion or considerable torsional oscillation to occur about the majority of bonds in the main chain. This terms is also used to define a "minimum film forming temperature" above which the polymer has enough internal energy and flow to form a film. In effect, then, the term "glass transition temperature" or "minimum film forming temperature" describes a type of internal melting point for a polymer, not a phase change, at and about which the polymer preserves the outward appearance of a solid but at the same behaves much like a liquid in its ability to undergo plastic flow and elastic deformation. For the purposes of this invention, the term "glass transition temperature" may be used interchangeably with and defined as the "minimum film forming temperature" of the polymer. Although theoretically this temperature is probably an exact point, in practice this point actually turns out to be a small temperature range due to the inability to achieve ideal equilibrium conditions.

From this definition, it is seen that at any given temperature T, a particular polymer and thus its latex may be either a good film former, non-film former, or marginal film former depending upon its Tg point (i.e., minimum film forming temperature). For example, if T is taken as room temperature (68°–75° F.), then any polymer having a Tg substantially greater than room temperature (for example 90° F.) will be a non-film former at temperature T, while any polymer with a Tg substantially below room temperature (for example, 66° F.)

will be a good film former at temperature T. Between these two extremes will be polymers that are marginal film formers. The term "marginal film formers" for purposes of this invention is used to describe a polymer existing at a temperature T which is generally within or about the Tg point of the polymer and which is intermediate a good film former and a non-film former in its flow characteristics. It is, of course, understood that the cutoff point between a non-film former and a marginal film former on the one hand and a marginal film former and a good film former on the other hand is not a specific point, but rather is a graduation or range of temperatures within which different amounts of polymer flow are occurring in an attempt to form a film.

For the purposes of this invention and in order to conveniently describe the ability of any particular polymer to attempt to form a film, the term "flow characteristics of a polymer" will be used. This term may thus be defined as describing those characteristics of a polymer or polymeric material in a latex which tend to form the material into a coalesced mass or film.

This invention is based upon the discovery that continuous, microcellular and non-porous opaque films possessing unusual hiding ability and opacity are obtained from novel latex mixtures comprising an aqueous continuous phase, dispersed non-elastomeric coalescable polymer non-solvent for the coalescable polymer in a weight ratio of non-solvent to polymer solids of about 0.05 to about 3:1.0, and an opacifying pigment in a weight ratio of pigment to polymer solids of from about 0.1 to about 5:1, preferably from about 0.5 to about 3:1.0. The non-solvent is selected such that it has a boiling point above that of water and having sufficient low volatility to remain entrapped in the polymeric matrix when the composition has reached a quasi-rigid or tack-free state when applied as a film. Once the film has become tack-free the non-solvent is removed so as to leave behind minute, closed cells which enhance the hiding and opacity of the film.

It has been unexpectedly found that by the addition of both a non-solvent for the non-elastomeric polymeric material and an opacifying pigment such as $TiO_2$ to a latex composition in designated quantities, a synergistic effect is obtained in the resulting films. In other words, the resulting films are whiter and have stronger hiding power than films produced from a latex composition which contain only a non-solvent or opacifying pigment alone. Thus, it is generally known that films are made opaque by the addition of a large amount of opacifying pigments such as $TiO_2$ to a latex composition. It is also known from the disclosures in my copending applications, Ser. No. 741,502, filed July 1, 1968, Ser. No. 745,433, filed July 17, 1968, as well as my copending application Ser. No. 48,199, filed June 22, 1970, of even date herewith, that by the addition of a large amount of a very low volatile non-solvent to a latex composition an opaque film is obtained even in the absence of an opacifying pigment. However, following the practice of this invention, it is possible to employ lesser amounts of both an opacifying pigment and non-solvent for the polymeric material and still obtain a film therefrom having greater opacity or whiteness and stronger hiding power than previously obtained from either of the aforementioned compositions. Thus, it is possible to employ both pigments and non-solvent in amounts which alone would not produce an opaque film having adequate hiding power.

As indicated hereinabove, the compositions of this invention contain non-elastomeric coalescable polymeric materials, water, non-solvent for the polymeric material, opacifying pigment, if desired, various additives commonly used to improve the characteristics of the resulting films. The amount of non-solvent and pigment is critical in obtaining the desired synergistic effect as alluded to hereinabove. The remainder of the latex composition will constitute water and other conventional additives, e.g., glycols. Even though the flow and wet edge of the compositions of this invention are superior than those of the prior art, these properties may be improved by the addition of glycol, from about 0.01 to about 2 parts of glycol per part of polymer solids being generally useful for this purpose.

In view of the increased hiding ability of the films of this invention, it is possible to formulate compositions containing less than about 25 volume percent of non-volatiles while maintaining the same hiding power and whiteness obtained from the prior art compositions which contain substantially higher levels of non-volatiles. Such compositions are of significant economic value.

When reference is made to "opaque" films, herein, it refers to a film having an optimum Kubelka-Munk scattering coefficient as alluded to above. Thus, the novel films of this invention have an optimum Kubelka-Munk scattering coefficient by entrapping a sufficient quantity of non-solvent in a quasi-rigid film which contains the aforementioned amounts of polymer solids and opacifying pigment therein to obtain the desired synergistic effect.

One method for entrapping a sufficient amount of non-solvent in the polymer matrix subsequent to continuous phase removal is to control the flow characteristics of the polymer particles during the removal of the continuous phase or water from the system after the latex composition liquid polymer has been applied to a substrate. By this control, the final permeability, porosity, and opacity (upon later non-solvent removal) of the final film may be specifically chosen and varied. The particular control technique used depends upon the type of polymer latexes chosen. Generally, it may be stated that for non-film formers, the technique of adding good film formers, marginal film formers, coalescers, plasticizers, and/or polymer thickeners may be used. For marginal film formers, the techniques of adding good film formers, coalescers, plasticizers, and/or polymer thickeners may be used. When using good film formers, flow inhibiting agents, marginal film formers, and non-film formers may be added in a predetermined amount to effect a desired result.

Temperature control during water removal is another technique generally applicable regardless of the ability of the coalescable polymer to form films at room temperature.

A preferred control technique which is applicable to all the systems described above is to employ a non-solvent for the polymer having sufficiently low volatility that the resulting coalesced film, upon continuous phase removal becomes tack-free prior to substantial evaporation of the non-solvent. This technique is particularly preferred when using good film formers since by employing a non-solvent with a very low volatility, thickeners and other flow retardants may not be necessary. If the non-solvent does not have sufficiently low volatility when using a good film former, alone, the voids formed by the non-solvent may not be able to withstand the flowing of the film during the final drying process. In other words, the flowing of the film will collapse the voids and produce a film opacified only by the presence of the opacifying pigment in the film.

When the film has reached a tack-free state, it will have sufficient gel structure so as to not flow and the remaining non-solvent can be evaporated to form the voids which will not collapse.

In the paint and coatings industry, a common method for determining if a film is tack-free is by the use of the "cotton test" or "Cotton Fiber Method." When a film is tack-free, cotton threads no longer adhere to the film. Specifically, this tack-free state of the film can be determined by A.S.T.M. Method D 1640–65T–5.2.1, whereby cotton fibers are dropped onto the film at regular drying intervals on a specified portion of the film. The film is considered tack-free when the fibers can be removed by blowing lightly over the surface of the film. Another method for determining whether the film is tack-free is by employing the "Powder Method" described as A.S.T.M. D 1640–65T–5.2.2. This method is conducted by depositing finely divided calcium carbonate (pigment grade) on the film at definite intervals during the drying period and after the film has dried to a tack-free state, the pigment can be removed by blowing with a gentle stream of air and wiping with a soft rag or camel hair brush. The film is considered tack-free when the pigment can be removed completely.

The invention also provides for the inclusion of pigments, dyes, fluorescent materials, and optical brighteners in the above-described films in such a way as to maximize their effectiveness therein.

Figure 1:
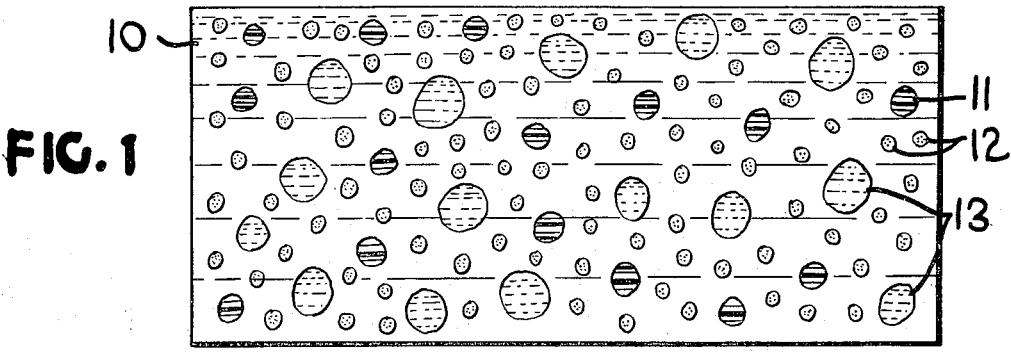
FIG. 1 is a greatly enlarged cross-sectional view of a latex composition of the invention, showing droplets of coalescable polymer and non-solvent dispersed in an aqueous continuous phase along with particles of pigment.

In the drawings, the proportions of the components are not drawn to scale.

DETAILED DESCRIPTION OF THE INVENTION

This invention contemplates within its scope several methods, compositions and products made therefrom, for producing unusually opaque films having exceptional hiding ability. Because of the novel nature of these methods and compositions, opaque films may be made from latexes of polymeric materials regardless of whether the polymeric materials are classified as non-film formers, marginal film formers, or good film formers.

The latex compositions of the invention comprise particles of both non-elastomeric coalescable polymer and opacifying pigment dispersed in water. The composition also contains a non-solvent for the polymer in a weight ratio of non-solvent to polymer solids of from about 0.05 to about 3:1.0, particularly from about 0.1 to about 1:1.0. The opacifying pigment is present in a weight ratio of pigment to polymer of from about 0.1 to about 5:1.0, preferably about 0.5 to about 3:1.0.

The basic method for producing films as contemplated herein comprises applying to a substrate the aforesaid latex composition and removing the water, which comprises the continuous phase of the latex. During this removal, a sufficient amount of non-solvent is entrapped in the coalesced polymeric material before it becomes tack-free so that upon evaporation of the remaining non-solvent, the resulting film is opaque and has enhanced hiding ability.

The amount of non-solvent entrapped in the polymeric material before it becomes tack-free can be controlled by several techniques. One technique is to control the flow characteristics of the polymeric material during water removal so as to accelerate the time at which the resulting film becomes tack-free. The flow characteristics of the polymeric material may be controlled by one of several techniques which will be described in greater detail hereinafter.

Another technique, which is a preferred embodiment of this invention, is to employ a liquid having very low volatility as the non-solvent. When using a good film former, the non-solvents should substantially boil above about 400° F. (i.e. the proportion of the non-solvent boiling below about 400° F. should be small). Instead of employing a very low volatile liquid as the non-solvent, it is possible to incorporate a large amount of liquid non-solvent in the latex composition so that there remains sufficient non-solvent in the polymeric material when it becomes tack-free, so that upon evaporation of the remaining non-solvent, the resulting film will have a desired opacity. However, it will be understood by those of skill in the art that often it is not economically feasible to employ excessive amounts of non-solvent in the composition. The amount of non-solvent added to the composition can be decreased by selecting a liquid which has a higher boiling range.

It will be understood, of course, that the amount of control effected depends upon the type of polymeric material used and the degree of uniformity desired in the resulting film. However, it may be stated that for the purposes of this invention which ultimately seeks to obtain opaque films, the amount of control is to an extent sufficient to form a film having entrapped therein minute or very small droplets of the non-solvent. The film at this point, i.e., having minute droplets of liquid entrapped therein, is not generally opaque but rather is usually transparent or translucent. In this form, the film may generally be considered an intermediate product. However, this intermediate product has utility in and of itself in that it may be used in this form for future removal either of the entire amount of the non-solvent to make an opaque film or only a partial amount of the non-solvent to make various film designs. In a preferred method, the operation forms a fully white and opaque film by removing the minute or very small droplets of non-solvent. In either case, the final or eventual removal of the non-solvent droplets result in the formation of tiny or minute voids in the film such that the film is non-porous and microcellular.

The term "latex" as used herein is a term well known in the art and describes a two-phase system. The first phase is referred to as the continuous phase and is made up essentially of water and at times certain soluble additives to effect various results (e.g., emulsifying agents). A preferred additive is a glycol, such as ethylene or propylene glycol, which improves the flow characteristics of the wet film. The second phase is a distinctly separate phase dispersed in the first phase, referred to as the discontinuous phase since it comprises a plurality of dispersed particles. Although particles may be of any convenient size, within the meaning of the term, the particles must form a distinct second phase as opposed to solutions and quasi-solutions. It is therefore readily seen that this type of water dispersion adds much commercial flexibility to a film making system when compared with a system which requires the great bulk and non-flexibility of a solution or quasi-solution.

The polymeric particles can be particles of any non-elastomeric coalescable polymer which can be stably dispersed in water. By "coalescable polymer" is meant a polymer which, either alone or in the presence of coalescing aids such as plasticizers or the like, form a continuous film at the temperature of use. Ordinarily, polymers which are coalescable at room temperature are preferred, but others which require heating or particular conditions to provide continuous films can also be employed. Mixtures of polymers, which may or may not be coreactive, are also useful; such mixtures can be either in the same particles or in different particles dispersed in the composition.

Among the polymers which can be utilized are non-elastomeric homopolymers and copolymers of various monomers, such as vinyl esters of saturated carboxylic acids, for example, vinyl acetate, vinyl propionate, or the like; alkyl or aryl esters of unsaturated carboxylic acids; including acrylates and methacrylates such as ethyl acrylate, butyl acrylate, 2-ethylhexyl acrylate, methyl methacrylate, phenyl acrylate, etc., and maleates and fumarates such as dimethyl maleate, butyl hydrogen fumarate, methyl ethyl maleate, and the like; unsaturated hydrocarbons, including aliphatic and aromatic monomers such as ethylene, butadiene, styrene, and vinyl toluene; vinyl halides, such as vinyl chloride, vinyl bromide and vinylidene chloride; unsaturated nitriles, such as acrylonitrile and methacrylonitrile; unsaturated amides, such as acrylamide, N-substituted acrylamide, and methacrylamide; unsaturated carboxylic acids, such as acrylic acid, methacrylic acid, maleic acid or anhydride, and fumaric acid; and other polymerizable monomers of various types.

In many cases preferred polymers comprise combinations of the above monomers, e.g. vinyl acetate-alkyl acrylate copolymers, alkyl acrylate-styrene copolymers and styrene-butadiene copolymers.

Other coalescable polymers which are useful under appropriate conditions include alkyd resins, both oil-modified and non-oil modified, and including alkyds modified by reaction with materials such as styrene or acrylic monomers; phenolic resins, i.e., condensates of a phenol and an aldehyde; epoxy resins, including esterified epoxies and epoxidized oils; polyurethanes, where these are made so as to be stably dispersed in water; aminoplast resins, i.e., aldehyde condensates of melamine, urea, benzoguanamine, or similar compounds; naturally occurring materials, such as rubber, shellac, casein etc.; and other polymers which are coalescable and water-dispersible.

The preferred coalescable polymers for use in the invention are acrylic polymers, i.e., polymers containing one or more acrylates or methacrylates, copolymers of vinyl acetate with a minor amount of a vinyl halide or an ester of an unsaturated acid, and copolymers of vinyl aromatic hydrocarbons with alkyl acrylates, dienes or other monomers.

The specific latexes contemplated for controlled film forming use herein include in their discontinuous phase non-elastomeric coalescable polymeric materials which may be non-film formers, marginal film formers, and/or good film formers. Some examples of non-film formers at room temperature (20°–25° C.) include vinyl acetate homopolymers (e.g., "Elvacet 84–1100"), latex homopolymers of styrene, latex homopolymers of methyl methacrylate or latex copolymers of styrene and methyl methacrylate. Preferred marginal film formers at room temperature include a butadiene-styrene latex such as that known as "Lytron 5202" and certain copolymers of ethyl acrylate and methyl methacrylate or styrene. Examples of good film formers at room temperature include acrylate polymers such as "Rhoplex AC–34," vinyl acetate copolymers such as the vinyl acetate copolymer latex of 75% vinyl acetate and 25% dibutyl maleate, and a vinyl acetate copolymer latex of 75% vinyl acetate and 25% 2-ethylhexyl acrylate.

Other copolymers which have been found to be useful include the copolymer of 35% methyl methacrylate and 65% ethyl acrylate ("Rhoplex AC–22"), the copolymer of 70% methyl methacrylate and 30% butyl acrylate ("Rhoplex AC–61"), the copolymer of 43% methyl methacrylate, 55% butyl acrylate and 2% methacrylic acid ("Rhoplex AC–388"), the copolymer of 65% butyl acrylate and 35% acrylonitrile ("Dow 358"), the copolymer of 42% 2-ethylhexyl acrylate, 50% styrene, 5% acrylonitrile and 3% methacrylic acid ("Ucar TCX–3410") and the like.

As it can be seen from the foregoing non-limiting list, a wide variety of latexes of water-insoluble non-elastomeric coalescable polymers and copolymers may be employed in the practice of this invention. The non-elastomeric coalescable polymers and copolymers are employed since, as compared to elastomeric polymers, they maintain the necessary rigidity to entrap the non-solvent in the coalesced film, and provide the necessary resistance to deformation of the dried film and the microvoids therein. The non-elastomeric polymers herein form films having an extensibility of less than about 400%, i.e., they undergo permanent deformation at elongations above about 400%.

The term "film forming" and "coalesce'" used herein refer to the ability of a polymeric material dispersed in the aqueous continuous phase of the latex to join together in coherent films as the continuous or water phase is removed from the latex.

Without the control techniques, a non-film former in latex form mixed with a non-solvent would not form a film upon removal of the water nor coalesce enough to entrap sufficient amounts of non-solvent to enable the resulting non-film coating to become opaque upon the later removal of the non-solvent. Marginal film formers in latex form generally form some type of semi-continuous film having entrapped therein some small amount of non-solvent, but without a control technique the resulting continuity and opacity depends solely upon the particular polymeric material used. Good film formers during coalescence flow very well and thereby form continuous films, and in order for there to be adequate non-solvent entrapped in the film, the non-solvent should be of sufficiently low volatility such that film formation is essentially complete, i.e., the film is tack-free, prior to evaporation of the non-solvent.

With the control techniques of this invention both opacity and film continuity can be varied and optimized over a wide range for any given latex system which will not decompose prior to reaching its flow point. These control techniques assume five basic forms as follows.

Firstly, the temperature of the applied mixture may be accurately controlled during water removal such that the system during flow or coalescence is held at a temperature a specific number of degrees from its glass transition temperature (Tg) or minimum film forming temperature. This first control technique is operative for all the latex systems contemplated herein whether they contain polymers which are non-film formers, marginal film formers, or good film formers. For example, if a non-film former latex system is used to achieve a substantially continuous film of optimum opacity, the system's Tg point is first determined by conventional techniques. The latex-non-solvent mixture is then applied to a series of substrates and by simple trial-and-error experimentation using various temperatures above the Tg point, optimization of opacity and continuity can be achieved. Similar procedures may be used for good film formers, which usually require a lowering of the temperature of the system, and marginal film formers which merely require careful control of temperature about their Tg point. Of course, it is understood that in the above described temperature techniques which use temperatures higher than the boiling point of water, the non-solvent liquid should be less volatile than water at the highest temperature used to control the flow characteristics. This insures that the non-solvent will become entrapped during control rather than evaporate off along with the water.

The second technique contemplated for controlling the flow characteristics of a latex system generally comprises adding coalescers, plasticizers, and/or polymer thickeners to the system in order to increase flow. Although this technique basically applies to marginal film formers, it may also be used to achieve both continuous and semi-continuous films from latexes of the non-film forming type.

The coalescers, plasticizers, and thickeners contemplated for use herein include those well known to the art, the choice depending upon the particular polymer component of the latex. Some examples of coalescers which may be useful are ethers, high boiling alcohols, esters and ketones. Some examples of plasticizers are dibutyl phthalate, butyl benzyl phthalate, triscresyl phosphate and polyethylene glycol. Some examples of thickeners are carboxy-methyl cellulose, hydroxy ethyl cellulose, maleic acid styrene copolymers, methyl methacrylate, methacrylic acid copolymers and copolymers of maleic anhydride and methyl vinyl ether.

The third technique contemplated for controlling flow characteristics generally comprises adding to the latex system (i.e., either before or after the non-solvent is added) various flow-inhibiting agents which retard the tendency of the particles during water removal to form a film. This technique is generally applicable when good film forming latexes are used to thereby prevent excessive flow and thereby insure the entrapment of non-solvent droplets. However, such a technique finds limited use with upper region marginal film formers when semicontinuous films are desired. Optimization of this technique, as in all of the techniques discussed herein, may be arrived at through routine experimentation. Some examples of the flow-inhibiting agents contemplated for use in this invention are such materials as silica powder, clay, pigments, and mixtures thereof.

The fourth basic control technique contemplated for use herein generally comprises adding either one or more non-film formers and/or marginal film formers to a good film forming latex system or adding one or more good film formers to a marginal film forming or non-film forming latex system to thereby control the flow of the resulting film forming composition. The additives which effect the desired control may be dry pigments or may themselves be latexes. For example, a non-film forming latex non-solvent mixture may have its flow characteristics enhanced by adding thereto a sufficient amount of a good film former to achieve optimum opacity and a desired film continuity. It is, of course, understood that this technique also contemplates the addition of marginal film formers as well as mixtures of marginal film formers and various other types of film formers to achieve the desired effects. Examples of applicable additives are those polymers exemplifying the various types of film formers used as the basic latexes of the applied mixture hereinbefore set forth.

A fifth technique contemplated for use herein to control the entrapment of the non-solvent in the film matrix of a good film former upon removal of the continuous phase generally comprises the use of a non-solvent having sufficiently low volatility such that the film is essentially tack-free prior to evaporation of the non-solvent. These non-solvents generally substantially boil above about 400° F., so that most of the non-solvent (which ordinarily is a mixture boiling over a range) boils above that temperature. Since these solvents are of such low volatility, the good film former undergoes substantial film formation and becomes tack-free prior to the evaporation of the majority of the non-solvent.

The above discussed techniques exemplify basic methods useful for controlling the flow characteristics of a film during continuous phase removal. It can be seen, however, that other control methods and variations and combinations of the techniques described also can be used. For example, the temperature technique can be used with the inhibiting technique to achieve further optimization for various systems which require extremely careful control. The other techniques may also be used in combination with one another or all the techniques may be used together if so desired or found necessary.

The above-described controls form an important part of the overall ability to achieve optimum opacity and film continuity. Another important factor in optimizing a desired result is the amount of liquid non-solvent added to the latex. For example, if too much non-solvent is added, the resulting film will be discontinuous. On the other hand, if too little non-solvent is added an insufficient number of voids will be formed and thus the desired opacity of the film is not achieved. The only adapting limitation on these control techniques when used in this invention is that they should control the flow characteristics of the polymer material sufficiently such that enough non-solvent is entrapped is discrete closed cells so that, upon evaporation of the non-solvent will result in the film becoming opaque.

The application of the polymeric material to a substrate in this technique may be done by any of the conventional methods such as by rolling, brushing, dipping, or spraying. The removal techniques contemplated herein are those techniques which are conventional in the art. For example, both water removal and liquid non-solvent removal may be effected by simple evaporation at room temperature or by forced air or heated air evaporation. Heating or vacuumization of the system to achieve both water and non-solvent removal may also be used.

A film having optimum opacity, for practical purposes, may be described as a film having a Kubelka-Munk scattering coefficient greater than 0.5 reciprocal mils at 4400 angstroms and greater than 0.1 reciprocal mils at 5600 angstroms. At this optimum point, the average diameter of the voids generally has been found to be less than about 5 microns, although good opacity may be achieved with void diameters as high as 30 microns. Therefore, for the purpose of this invention, the amount of non-solvent mixed with the latex containing the opacifying pigment should not be so great as to effect a discontinuous film upon removal of the water from the system but at the same time must be great enough so that the resulting film will at least approach the described optimum opacity characteristics. Given the proper amount of liquid non-solvent, then, the various control techniques as above described will be corelated with this amount of non-solvent, in order to achieve the desired results.

To obtain films which have an optimum scattering coefficient as described above, it has been found desirable to employ compositions having a weight ratio of non-solvent to polymer solids of from about 0.05 to about 3:1.0. It will be understood by those of skill in the art that for some system other ratios will be applicable. For example, if the continuous phase contains a higher boiling component (e.g., glycol), a larger amount of non-solvent will be required. On the other hand, if a large amount of a flow inhibiting agent is employed a lesser amount of non-solvent may be required to obtain a film having an optimum opacity and superior hiding as described hereinabove.

The non-solvent liquids contemplated for use herein are non-solvents for the polymeric materials in the latex and generally have a boiling point above 100° C. These non-solvent liquids may be either miscible or immiscible in the water phase of the latex and when added to the latex may be added alone or along with various additives, such as an emulsifying agent.

The basic requirements for the non-solvent are that it be dispersible in water and less volatile than water, and that it be a non-solvent for the coalescable polymer. It is preferable that the non-solvent be volatile or at least volatizable, so that the non-solvent can be vaporized when desired to remove it and produce microvoids in the film. Heat or low pressures can be employed and thus non-solvents of very high boiling points (i.e., up to the melting point of the coalescable polymer or even higher) are useful, as are sublimable solids under appropriate can also be useful, these require removal by extraction or similar means and thus are relatively undesirable. It will be understood, however, that each polymer or copolymer will have its own series of usable and optimal non-solvents. Those most suited for any particular latex system may be readily selected by the skilled artisan on the basis of the known physical properties of liquids and polymers. One method which may be employed in selecting the optimum-non-solvent for a particular latex system is the method of Hansen ("The Three Dimensional Solubility Parameter and Solvent Diffusion Coefficient and Their Importance in Surface Coating Formation," Copenhagen, Danish Technical Press, 1967) to determine liquids which will not solubilize the particular polymer selected. Once these liquids are ascertained, the solubility parameters found in the work of Hoy ("Tables of Solubility Parameters, Union Carbide Corporation, South Charleston, W. Va., May 31, 1967) may be utilized. The work of Hoy tabulates the relative evaporation rates of liquids wherein a non-solvent can be selected which has a low enough volatility to remain in the coating long enough to form voids before evaporating.

An example of utilizing the foregoing method can be illustrated by selecting poly(vinyl acetate) as the latex polymer system. The Hansen parameters for this system are $\Delta d=9.3$, $\Delta p=5.0$, $\Delta h=4.0$, and $R=4.9$. Thus, the only practical materials outside this large solubility sphere are the water soluble liquids such as glycols, alcohols, amines, etc. and the non-polar aliphatics such as hexanes, cyclohexane, carbon tetrachloride, etc. Since water solubles are not preferred, the non-polar aliphatics would be selected. Referring to the Hoy tabulation of relative evaporation rates (which are based upon butyl acrylate as 100) it can be seen that the aliphatic hydrocarbon such as decane (B.P. 172° C., relative evaporation rate=12.96), undecane (B.P.=193° C. relative evaporation rate =4.41) and dodecane (B.P.=214° C. relative evaporation rate=1.42) are all reasonable non-solvents for the poly(vinyl acetate) latex system. A commercially available liquid non-solvent which will simulate these pure compounds is ordinarily then chosen and utilized.

Some examples of non-solvents which have been found particularly useful are odorless mineral spirits, high flash aliphatic naphtha, naphthenic mineral oil, neat's foot oil, pine oil and the like. The odorless aliphatic mineral spirits and high flash aliphatic naphthas generally have a boiling point range of from about 300° to about 600° F., preferably from about 400° to 550° F. when employing a good film former without the addition of flow inhibitors. Typical mixed aliphatic-aromatic compounds which may be employed as non-solvents are phenyl cyclohexane, triethyl benzene, phenylpropane and the like. Various other compounds may be employed as non-solvents such as dicyclohexyl amine, isoamyl bromide, trichloropropane, methyl benzyl ketone, allyl butyrate and the like.

The emulsifying agents which may be employed include many conventional and well known materials. Preferred emulsifying agents are alkyl aryl polyether alcohols, such as the surfactant known commercially as "TX–305" which is poly(oxyethylene) octyl phenol.

Various other materials known in the coatings industry may also be added to the compositions of this invention to achieve particular desired results. Among some of the materials which may be added to the compositions of this invention are fungicides, mildewcides, surfactants, flow modifiers, thickeners, free flow stabilizers, anti-skin agents, anti-flocculant, pH stabilizers and various other additive known by those of skill in the art.

When some of the foregoing additives are added to the composition, care must be taken to insure that sufficient non-solvent will be entrapped in the polymeric material prior to the time at which the material becomes tack-free in order to provide sufficient void formation and to obtain a film having the desired opacity and hiding upon the evaporation of the non-solvent.

The selection of the appropriate additives for films which will eventually contain a plurality of micro-droplets of non-solvent when the film has coalesced during an intermediate period is a refinement wherein several factors must be considered. For example, many commercial materials must eventually be compatible with a universal colorant tinting system. Thus, surfactants which are mainly water soluble are much less effective than those which have marginal water solubility and fairly good oil solubility. It is believed that the reason for this is the probability of the non-solvent stealing surfactant from the alkyd compatible tints. It has unexpectedly been found that the marginally soluble surfactants in the compositions of this invention reduce the likelihood of this occurrence. Thus, the marginally soluble surfactants do not flocculate the colored pigments.

The selection of an appropriate anti-foam is generally an easier task when employing the compositions of this invention as compared to many prior art compositions since the non-solvent present tends to reduce the foaming tendency of the latex. The only particular consideration required is to provide a system which will not flocculate the colorants. However, if it is desired to add freeze-thaw stabilizers or wet-edge lengtheners, special precautions may be necessary since these additives have a tendency to lengthen the dry time of the film. Therefore, when an additive such as ethylene or propylene glycol is added to a polymeric material which is not plasticized by these materials, a lower volatility non-solvent should be used since it is important to maintain a major portion of the non-solvent droplets in the film until it has reached a quasi-rigid form on the tack-free state referred to hereinabove. Similar considerations must be taken if coalescing aids having low volatility are added to the system. In other words, the choice of nonsolvent must be modified to take into account the extended flow time so as to maintain a period of quasi-rigid film non-solvent entrapment in the coalesced film.

When a thermosetting or curable coalescable polymer has been used in the preparation of a film by any one of the above techniques, crosslinking may be effected either by simply heating the film, or by adding various well known cross-linking agents and thereafter curing the film. Various methods known by those of skill in the art can be used, such as heat, moisture, oxidation, catalysis, and radiation depending upon the type of polymer used. Cross-linking agents include co-reactive resins, such as aminoplast resins. Another example of a cross-linking agent is toluene diisocyanate, which when used with a vinyl acetate polymer latex or other copolymer containing hydroxyl groups is emulsified into the latex just prior to application and thus will effect a cross-linking structure in the film thereby to cure it. Cross-linking can also be effected with some polymers by treatment of the film with ranging irridation (e.g., accelerated electrons) or with ultraviolet light, or by a similar technique.

Figure 2:
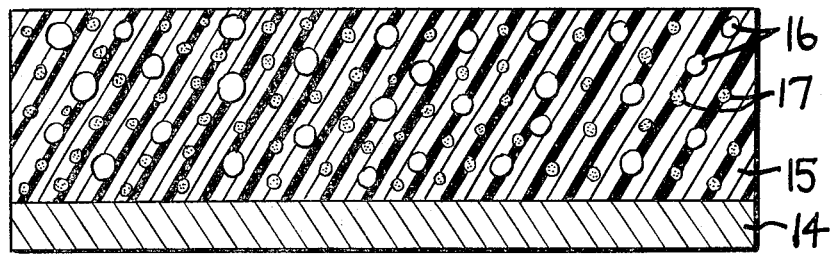
FIG. 2 is a greatly enlarged cross-sectional view of a dried film produced from a latex composition such as that in FIG. 1.

Illustrating the latex compositions of the invention and the films made therefrom are FIGS. 1 and 2 of the drawing herein. FIG. 1 shows a latex in which the aqueous continuous phase 10 contains dispersed particles of coalescable polymer 11 and pigment 12, and larger droplets of non-solvent 13. In FIG. 2, the substrate 14 has thereon a dried film of the latex composition in which the polymer matrix 15 contains minute voids 16 and pigment 17.

The present invention also includes various processes for incorporating, within the various above-described films, colored pigments, dyes, fluorescent materials and optical brighteners so as to add various characteristics, such as to enhance color, brightness, and fluorescence to these films.

Figure 3:
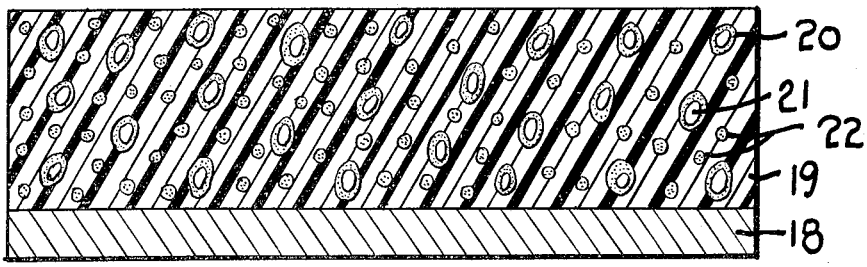
FIG. 3 is a greatly enlarged cross-sectional view of a film made in accordance with an embodiment of the invention wherein a dye material is deposited on the interfaces of the film voids.

One method of incorporating dyes within the films for purposes of this invention comprises the steps of dissolving the dye in the liquid non-solvent. The non-solvent-dye solution is then added to a suitable latex and an intermediate film having dispersed therein minute droplets of the liquid non-solvent-dye is formed. Upon the removal of the non-solvent from the intermediate product, as by evaporation, the dye material is precipitated or left as a solid distributed upon the internal surface of the voids formed when the non-solvent is removed. The resulting product is illustrated by FIG. 3, wherein the substrate 18 has thereon a film of polymeric matrix 19 having therein minute voids 20 with a layer of dye 21 distributed on the internal surfaces along with pigment particles 22.

Other methods may be used to locate the dyes within the above-described films. In many instances, these methods result in the dyes being located within the matrix of the film rather than in the voids.

Many dyes suitable for use in this invention are well known in the art and include both oil and water soluble dyes. Some examples are flushed alkali blue, Nubian resin black, calco oil blue ZA, and nigrosine black. In those instances where water soluble dyes are used, the resulting film will in most instances have the dye dispersed in the matrix.

Figure 4:
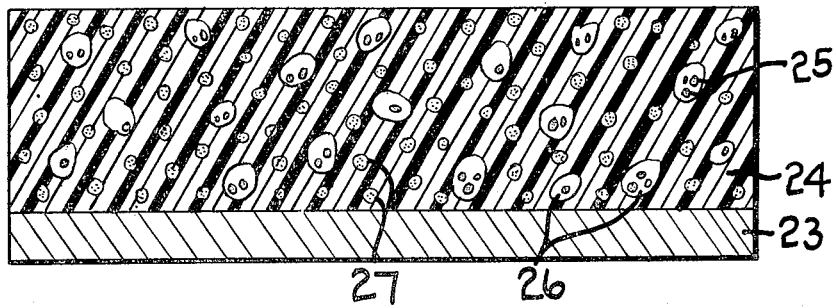
FIG. 4 is a greatly enlarged cross-sectional view of a film made according to another embodiment of the invention wherein pigment particles are dispersed within the film's voids.

Pigments may be incorporated into the films of this invention by a number of applicable techniques. In some cases, for example, when using coloring pigments, one may wish to distribute part (or even all) of the pigment in the voids. By dispersing the pigment particles in the liquid-non-solvent, after the particles are ground to a fine powder, and using the non-solvent-pigment dispersion with a suitable latex in one of the above-described methods to form a film, pigment particles are distributed within the voids formed as the non-solvent evaporates. Distribution of pigment particles in this manner is illustrated by reference to FIG. 4 wherein the substrate 23 has thereon a film of polymeric material 24 containing pigment particles 25 distributed in the voids 26. As can be seen, in some instances a void 26 may contain one or more pigment particles 25. Pigment particles 27 can also be in the polymer matrix.

Pigments may also be incorporated directly into the polymer matrix of the films of this invention rather than specifically within the voids as described above. This may be done by dispersing pigment in the water phase of the latex rather than in the non-solvent. When the film is formed by using one of the above control techniques, the pigment particles are entrapped in the polymer matrix much in the same manner as the minute droplets of non-solvent are entrapped. Upon evaporation of the non-solvent a film is formed wherein the polymer matrix contains both pigment particles and minute discrete voids.

As described hereinabove, when a white opacifying pigment is incorporated within compositions, films, and coatings of this invention, the resulting compositions are more white and possess remarkedly improved hiding than the prior art compositions while employing the same amount of white opaque pigment. In other words, less white opacifying pigment is needed to obtain the same degree of whiteness and hiding achieved by the prior art compositions.

When other opacifying pigments are incorporated within the compositions, films, and coatings of this invention, the resulting films are more opaque than the prior art films while employing the same amount of opaque pigment. In other words, less opacifying pigment is needed to obtain the same degree of opacity achieved by the prior art compositions.

Among some of the opacifying pigments (known as "prime pigments") which may be incorporated within the films of this invention are titanium pigments, lead pigments, zinc pigments, antimony pigments, cadmium pigments, molybdenum pigments and iron pigments, just to mention a few. Specifically, white opacifying pigments which may be employed include anatase titanium dioxide, rutile titanium dioxide, basic carbonate white lead, basic sulfate white lead, basic silicate white lead, zinc oxide, leaded zinc oxide, zinc sulfide, lithopone, titinated lithopone and antimony oxide.

In especially preferred embodiments of incorporating pigments into the films of this invention, titanium dioxide ($TiO_2$) or antimony oxide ($Sb_2O_3$) are used as the pigment. Titanium dioxide pigments are preferred for purpose of this invention since these pigments have long been used as white opacifiers for polymeric films, paints, etc. In prior systems, however, opacity was not optimized because, as hereinbefore described, optical opacity depends upon the ability of a pigment to scatter light. Since scattering depends upon the relative refractive indices of the pigment and its vehicle, the effect of the pigments was diminished in prior systems by the relatively high reflective index of the solid polymer films which surrounded it. Now, according to this invention, by forming voids in polymeric films as hereinabove described while at the same time incorporating a pigment such as $TiO_2$ or $Sb_2O_3$ into the matrix of polymer, the refractive index of the vehicle which surrounds the pigment is lowered since it is the average of the relatively high refractive index of the polymer and the lower refractive index of air. Thus, the opacifying affect of $TiO_2$ or $Sb_2O_3$ on a film is optimized by the opaque films of this invention. It is also understood, of course, that the pigments may be incorporated within the voids of the film as hereinbefore described and such an embodiment also constitutes a part of this invention.

Even though antimony oxide has a lower refractive index than $TiO_2$, it is in many cases a preferred white opacifying pigment because it has a lower absorption of light in the near ultarivolet region than $TiO_2$. Thus, it is possible to incorporate antimony oxide in conjunction with a fluorescent material into the films of this invention to obtain both an ultra white and fluorescent coating composition. The use of antimony oxide is particularly preferred when incorporated into the films of this invention which contain chlorinated organic compounds because an ultra white fire-retardant coating is produced which can be used where the coating is to be subjected to high temperatures such as on air and space craft, boiler tanks and the like.

It is also possible to incorporate known white extender pigments within the compositions of this invention to achieve a whiteness only obtained by white opaque pigments (prime pigments) when using the prior art compositions. The term "white extender pigments" is a term recognized by those skilled in the art. It refers to those pigments which are characterized as being white, near-white or colorless and having an index of refraction substantially below 1.75 (usually 1.45 to 1.70). Since most of the prior art films have an index of refraction in the range of 1.4 to 1.6, white extender pigments must be used in conjunction with a prime pigment due to the fact that light scattering depends upon the relative refractive indexes of the pigment and its vehicle. Now, according to the practice of this invention by incorporating an extender pigment into the films containing voids within the film structure, the effect of such pigments is upgraded to nearly that of a prime pigment. This is due to the voids within the film matrix, which lower the refractive index of the vehicle, since the refractive index which surrounds the pigments is the average of the relatively high refractive index of the polymer and the lower index of a refraction of the air or vapor which is entrapped within the voids. Thus, the opacifying affect of prime pigments is increased to a degree far superior to the prior art coatings and extender pigments are capable of being upgraded to nearly that of prime pigments when incorporated within the composition of this invention.

White extender pigments are well known in the art. Examples of white extender pigments which may be incorporated with the compositions of this invention are whitings ($CaCO_3$), gypsum ($CaSO_4$), magnesium silicate ($3MgO \cdot SiO_2 \cdot H_2O$), magnesium carbonate ($MgCO_3$), china clays ($Al_2O_3 \cdot 2SiO_2 \cdot 2H_2O$), mica $$(K_2O \cdot 3Al_2O_3 \cdot 6SiO_2 \cdot 2H_2O)$$

silica ($SiO_2$), diatomaceous silica, barium sulfate ($BaSO_4$), barium carbonate ($BaCO_3$), and aluminumhydrate ($Al(OH)_3$). It will be understood that many other known white extender pigments may be used in accordance with the practice of this invention and the pigments indicated hereinabove are merely exemplary of the many which are known in the art.

It is also possible to incorporate various known colored pigments into the films of this invention. Some red pigments which may be used in accordance with the practice of this invention are Indian red ($Fe_2O_3$), tuscan red, venetian red, red lead ($Pb_3O_4$), orange mineral, English vermillion (HgS), American vermillion (chrome red, scarlet lead chromate which is a basic chromate of lead), and lakes which are formed by combination of the coloring matter of certain dyes with inorganic carriers, such as $BaSO_4$, $CaSO_3$, or clay. Among the most important lakes are the vermillions and scarlets made from para red, and from alizarin. Examples of blue pigments which may be incorporated in the films of this invention are phthalocyanine blue, Prussian blue ($Fe[Fe(CN)_6]_3$) being the approximate empirical formula, ultramarine, cobalt blue, sublimed blue lead consisting mainly of $PbSO_4$ and PbO with a minor amount of PbS, $PbSO_3$ and ZnO. Some of the preferred green pigments are phthalocyanine green, chrome green and chrome oxide green. It is also possible to incorporate some of the well known yellow pigments such as chrome yellows, yellow ochers and raw siennas. It is also contemplated by employing the practice of this invention to incorporate brown pigments such as burnt sienna, raw umber, burnt umber and Vandyke brown otherwise known as Cassel earth or Cologne earth which is a natural pigment of a carbonaceous nature and is distinguished by its solubility in dilute alkali.

It will be understood by those of skill in the art that many other pigments may be incorporated into films of this invention. The pigments indicated hereinabove are some of the more important pigments which may be used.

Optical brighteners, fluorescent materials and mixtures thereof may also be incorporated within the films of this invention to effect their known characteristics upon the films. Optical brighteners are well known in the art and are generally defined herein as those materials which absorb appreciable light energy in the ultraviolet region of light and emit energy within the visible region of light. Thus, such materials serve to brighten the vehicles which carry them. Fluorescent materials are like-wise well known in the art and are generally defined herein as those materials which absorb light energy in the ultraviolet and portions of the visible region of light and emit light energy of a given wave length (i.e., color) in the visible region of light. Thus, such materials brightly color the vehicles which carry them.

The incorporation of optical brighteners and fluorescent materials into the films of this invention achieve a unique effect. That is to say, films rendered white and opaque by the addition of $TiO_2$ thereto are only brightened or colored by the addition of optical brighteners and fluorescent materials to a limited degree. This is due primarily to the fact that large amounts of $TiO_2$ are necessary to obtain adequate hiding and the $TiO_2$ screens substantially all of the ultraviolet light from the brightener or fluorescent material since it absorbs ultraviolet light. The films of this invention, without the addition of large amounts of $TiO_2$, are highly white and opaque due to the discrete voids therein and the ultraviolet light is not absorbed as much as with the prior art paints. When optical brighteners and fluorescent materials are incorporated into these films, therefore, their effect upon the films is maximized. The use of antimony oxide is a pigment in the films of this invention is a particularly preferred embodiment since it optimizes the whiteness of the films and in addition thereto does not screen the majority of ultraviolet light from the brightener or fluorescent material since it has a lower absorption in the near ultraviolet than $TiO_2$.

Optical brighteners and fluorescent materials may be incorporated either into the polymer matrix of the films of this invention or into the voids thereof in the same manner as pigments were incorporated therein. That is to say, particles of an optical brightener or fluorescent material may be dispersed either in the water phase of a polymer latex or in the non-solvent which is added to the latex to achieve the indicated effect when the film is formed by a given control technique as above described. Examples of optical brighteners and fluorescent materials useful in the films of this invention include such well known compounds as sodium 4,4' - bis(p - amino - benzamide)stilbene-2,2'-disulfonate, 4,4'-bis(benzoxazol-2-yl)stilbene, 4,4' - bis(6 - methylsulfonylbenzoxazol-2-yl)stilbene; 4,4' - bis(5 - methoxybenzoxazol-2-yl)stilbene, and such well known fluorescent pigments as finely powdered pink, orange, green, red or yellow organic pigments conventional in the art.

The compositions of this invention are useful as paint compositions and can be prepared at a lower initial cost than previous coatings compositions which require the addition of higher levels of pigments in order to achieve adequate hiding and opacity. In other words, the compositions of this invention provide films having opacity and superior hiding by utilizing a non-solvent which has a lower initial cost than previous coating compositions which employ costly pigments. Therefore, the compositions of this invention are not only useful in that they are capable of producing a whiter film than previously obtained by the addition of the opacifying pigment with the non-solvent, but are also useful in a real commercial sense from the standpoint of raw materials. Thus, the present invention is a significant advance in the art.

The composition of this invention may be applied as films to various types of surfaces or substrates. These surfaces may be of the type whereby the film is to be removed by suitable method, such as by use of release coatings, or of the type which is the final substrate, such as the wood of a house. Among the more suitable surfaces which may be coated with the compositions of this invention are steel, treated steel, galvanized steel, cement, glass, fabrics, wood, plasterboard, aluminum, treated aluminum and plastics.

The preferred films produced by the practice of this invention are characterized by the presence therein of a large number of discrete closed cells. Substantially all of these cells or voids are less than about 10 microns, and preferably less than about 5 microns, in size. Films formed from the compositions of this invention contain closed cells essentially none of which are larger than about 30 microns. In other films the average size of the cells may be as low as 0.5 micron.

A film having an apparent thickness of, for example, 10 mils will have a real solid thickness which is equal to the sum of the thickness of each wall between the discrete cells lying along a path perpendicular to the outermost planar surface of the film which may be, for example, no more than one mil. This property renders the films of this invention, particularly those having an average cell size of less than about 10 microns, useful as vapor or liquid permeation membranes which may be utilized for a number of applications such as, for example, in desalinization processes. Thus, the film is of sufficient apparent thickness to provide the required amount of strength; yet the total thickness of the solid polymer through which a molecule must pass (i.e., the cell walls) is relatively small.

Furthermore, a diffusion per unit of time of a vapor or liquid through a unit area of some of the films of this invention is far greater than that in the case of non-porous films heretofore available.

Certain preferred films of this invention reflect light of wave lengths below 3800 angstroms which makes them useful as ultraviolet light reflectors providing the polymer does not absorb light in the near ultraviolet range. Further, these films may be prepared to be of such whiteness as to be of use of light reflectance standards.

The following examples serve to more fully described the manner of making and using the above described invention as well as to set forth the best modes contemplated for carrying out various aspects of the invention. It is understood that these examples in no way serve to limit the true scope of this invention but rather are presented for illustrative purposes only. It will be understood that all proportions are in parts by weight and are based upon non-volatile solids content unless otherwise indicated.

The following Examples I to XII illustrate the control techniques utilized to form non-porous microvoid-containing films.

EXAMPLE I

To 50 parts by weight of an acrylic latex containing 45% by weight of a hard, non-film forming coalescable copolymer, the copolymer consisting approximately of 65% methyl methacrylate and 35% ethyl acrylate having a minimum film forming temperature of 102° F. ("C–72") there are added 25 parts of an aliphatic hydrocarbon non-solvent for the acrylic polymer ("Isopar M," B.P. range 405° to 495° F.). The mixture is thoroughly agitated until the non-solvent ("Isopar M") is dispersed in the acrylic latex. Five portions of this dispersion are then drawn down, one portion on each of 5 consecutively numbered Alodene 1200 aluminum panels using a .070 wire would drawbar. Each film so formed is held for 20 minutes at a different temperature to effect water and non-solvent removal therefrom. The results are as follows:

TABLE A

| Panel number: | Temp., ° F. | Type film formed |
|---|---|---|
| 1 | 75 | Discontinuous powder. |
| 2 | 95 | Continuous—white film, slightly flakey. |
| 3 | 105 | Continuous—white film, good uniformity. |
| 4 | 129 | Continuous clear film. |
| 5 | 180 | Do. |

This example illustrates the temperature control technique of this invention that may be used to control the flow characteristics of a polymer system in order to effect different final films. Note in Table A that as the temperature during film formation is increased above the Tg temperature (102° F.) of the polymer, less and less non-solvent is entrapped and the resulting film is less and less opaque.

Although the above example illustrates the use of a non-film former, like control may be achieved when using marginal film formers and good film formers as well.

EXAMPLE II

To 50 parts of acrylic latex in which the coalescable polymer is a good film forming acrylic copolymer consisting of about 66% ethyl acrylate, 32% methyl methacrylate and 2% methacrylic acid ("Rhoplex AC–34," containing 46% by weight of polymer solids) there are added with agitation, 25 parts non-solvent ("Isopar M") and 2.25 parts of a finely ground transparent silica (Syloid 161). The purpose of adding the silica is to help non-solvent release. This agitated mixture is then drawn as a film similarly as described in Example I and dried at 75° F. to remove the non-solvent. Even with the small amount of flow retarding silica present, the flow of polymer continues after a substantial portion of the non-solvent has evaporated and the non-solvent is therefore not entrapped. The resulting film is a continuous clear film.

To the above-described basic agitated mixture is added with stirring an additional 5 parts of silica in order to inhibit flow. The mixture is then applied and drawn into a film. Upon evaporation of the non-solvent at 75° F. a continuous white, opaque film is formed having a Kubelka-Munk scattering coefficient greater than 0.5 reciprocal mils at 4400 angstroms and greater than 0.1 reciprocal mils at 5600 angstroms.

To this latter agitated solution is again added an additional 5 parts of silica in order to inhibit polymer flow to an even greater extent and 50 parts of water is added to allow a film to be drawn. The resulting coating, when dried at 75° F., is a discontinuous powder indicating that flow had been greatly inhibited.

The above example clearly illustrates the control technique of this invention wherein a flow-inhibiting agent is added to a good film former to control the characteristics of the final film and more preferably to optimize white opacity of a film made from a given polymer latex system. The example also illustrates that the composition must be capable of coalescing at room temperature (about 25° C.) or below in order to produce a continuous film which will entrap a sufficient quantity of non-solvent droplets in the quasi-rigid film.

EXAMPLE III

A mixture of 35 parts of the latex of Example I and 15 parts of the latex of Example II is formed to thereby obtain a marginal film forming latex system (i.e., a glass transition temperature (Tg) of approximately room temperature). To this mixture is added 25 parts non-solvent ("Isopar M") and 2.25 parts silica ("Syloid") to aid in the non-solvent release. After agitating this mixture, a first portion of it is drawn into a film as in Example I and dried at room temperature. The resulting film is continuous and white having an optimum Kubelka-Munk scattering coefficient.

A second portion of the above marginal film forming latex system is drawn into a film as described and dried at 37° F. The resulting coating is a powder and not a film.

To a third portion of the above marginal film forming latex system is added with thorough agitation, 4 parts of butyl benzyl phthalate, which is a plasticizer for the polymers. The resulting mixture is drawn as a film by the drawbar procedure of Example I and dried at room temperature. The resulting is a clear film thus illustrating that the plasticizer increased flow to such an extent (i.e., lowered the glass transition temperatures (Tg) of the system) that insufficient non-solvent is entrapped in the film upon water removal therefrom.

This example clearly illustrates that temperature, addition of plasticizers, etc., and addition of non-film formers to good film formers may be used to control the flow characteristics of a polymer system in order to effect various characteristics of the final film. Also illustrated with reference to the second portion above is that temperature control and additive control can be used in combination to effect a desired final film.

The above Examples I–III, then clearly illustrate the controls disclosed hereinabove and combinations thereof which may be used to control the flow characteristics of polymeric materials which make up the solid discontinuous phase of a latex system. Once given these examples as well as the above description, many other combinations of these controls and/or film formers will become apparent with predictable results as indicated by the above-illustrated embodiments.

The following examples further illustrate this invention as it may be applied to various other polymer systems.

EXAMPLE IV

To 100 parts of a marginal film forming butadiene-styrene latex known as "Lytron 5202" having a glass transition temperature (Tg) of approximately room temperature there are added with agitation 60 parts of odorless aliphatic mineral spirits (a non-solvent for the butadiene-styrene copolymer having a B.P. range of 349° to 406° F., refractive index 1.4217 at 20° C., specific gravity 0.754 (60/60° F.) and a kauri-butanol value of 25.3) and 2 parts of poly(oxyethylene)octyl phenol surfactant (known as "TX–305"). This mixture is then drawn as a film as per the drawbar procedure of Example I. The resulting film is semi-continuous with some white areas and some clear areas therein.

To the above mixture is then added one part of a methylvinyl ether-maleic anhydride adduct copolymer thickener (known as "Gantrez AN 139"). The mixture is again drawn as a film which after drying at room temperature is a semi-continuous film of generally uniform whiteness. When this mixture is brushed as a "paint" onto a wooden substrate, it forms a very white coating thereon after drying at room temperatures.

EXAMPLE V

A mixture of 80 parts of the marginal film former of Example IV ("Lytron 5202"), 20 parts of a good film forming acrylic latex ("Rhoplex AC–34"), 1.0 part thickener ("Gantrez AN–139"), 6 drops of a conventional antifoam emulsion agent (e.g., Dow Corning "H–10"), and 40 parts of odorless aliphatic mineral spirits (B.P. range 349° to 406° F.), is formed and thoroughly agitated. This mixture is then drawn by drawbar technique to a 3 mil thick film and is recoated after it dries. The resulting dry film is a poor, seedy-white film which improves slightly upon recoating.

The same mixture as above is again formulated except that 60 parts of the marginal film former and 40 parts of the good film former are now used. The resulting film, dried at room temperature is a white continuous film which becomes a much smoother white upon recoat.

EXAMPLE VI

A mixture of 100 parts of latex containing 55% by weight of a good film forming vinyl acetate copolymer consisting of 75% vinyl acetate and 25% dibutyl maleate, 20 parts of spray satin clay (a flow inhibiting agent) and 40 parts of water is formed and agitated. To this mixture is added various amounts of non-solvent odorless aliphatic mineral spirits (B.P. range 349° to 406° F.) and the resulting mixture is drawn into a film and dried at room temperature to a 3 mil film. The results are as follows:

TABLE B

| Film | Amount of non-solvent added (parts) | Type of film formed |
|---|---|---|
| A | 0 | Clear. |
| B | 20 | Part white. |
| C | 40 | More white than B. |
| D | 60 | Good white. |

This example clearly illustrates how flow may be retarded in a good film former by the addition of both a flow inhibiting agent and increasing amounts of non-solvents.

EXAMPLE VII

One hundred parts of the copolymer latex of Example VI is mixed with 3 parts of a clay slurry. The clay slurry, previously formulated, consists of 100 parts of spray satin clay, 50 parts of tap water and 2 parts polyether-phenol adduct surfactant ("TX–305"). To this mixture is added various amounts of odorless aliphatic mineral spirits (B.P. range 349° to 406° F.) in increments of 10 parts up to 40 parts. Upon drying none of the films drawn and dried at room temperature after each incremental addition of non-solvent, are white.

EXAMPLE VIII

To 100 parts of the copolymer latex of Example VI there are added 2 parts of spray satin clay and 40 parts of aliphatic odorless mineral spirits (B.P. range 349° to 406° F.). Upon forced-air drying at room temperature, a film formed from this mixture is very white and continuous. If 80 parts of the aliphatic odorless mineral spirits are added instead of 40 parts, the resulting film is only a fair and dull white.

EXAMPLE IX

To 100 parts of the copolymer latex of Example VI there is added 3 parts of a clay slurry consisting of 200 parts of spray satin clay, 100 parts of tap water, and 0.06 part of the polyether-phenol adduct surfactant ("TX–305"). After the addition of various amounts of the odorless aliphatic mineral spirits (B.P. range 349° to 406° F.), the following characteristics of a film formed by forced air drying are noted:

TABLE C

| Film: | Amount non-solvent (parts) | Type film |
|---|---|---|
| A | 0 | Clear. |
| B | 10 | Do. |
| C | 20 | White. |
| D | 30 | Do. |
| E | 40 | Do. |

Examples VIII–IX and a comparison therebetween further illustrate how polymer flow may be controlled in a good film former by varying the amount of both the flow inhibiting agent and the non-solvent added thereto.

EXAMPLE X

A mixture of 400 parts of a non-film forming vinyl acetate homopolymer latex and 200 parts of the good film-forming copolymer latex of Example VI is formed with agitation. To this mixture there are added with stirring various amounts of odorless aliphatic mineral spirits (B.P. range 349° to 406° F.) as a non-solvent mixed with small amounts of an ester surfactant. Each increment of mineral spirits is added slowly to the latex, i.e., over a period of approximately 15 minutes. The following results are noted:

TABLE D

| Film: | Amount non-solvent (parts) | Amount surfactant (parts) | Type film |
|---|---|---|---|
| A | 100 | 2 | Very flexible, relatively clear, a few very large voids. |
| B | 200 | 4 | Flexible, weak film, off-white. |
| C | 300 | 6 | Flexible, very weak film, fair white. |
| D | 400 | 8 | Stiff, extremely weak film, good white. |

EXAMPLE XI

A mixture of 400 parts of the non-film forming latex of Example X, 200 parts of a good film forming latex of Example VI, and 20 parts of aqueous ammonia is formed. Over a period of 15 minutes a mixture of 200 parts of odorless aliphatic mineral spirits, 50 parts of toluene diisocyanate and 4 parts of stearic acid is added with stirring to the latex mixture. The resulting mixture is heated to a 150° F. and held for 10 minutes at this temperature with the addition of water to prevent coagulation. A film drawn from this solution is a continuous, white, water-resistant cross-linked film having discrete voids therein.

EXAMPLE XII

Various films having a thickness of 3 mils are drawn from the following mixtures:

(A)

Parts
Non-film forming acrylic latex ("Rhoplex AC–73") having a glass transition temperature of 99° F. ___ 100
Odorless aliphatic mineral spirits (B.P. range 349° to 406° F.) _____ 50
Butyl benzyl phthalate as a plasticizer _____ 1.5

(B)

Parts
Non-film forming acrylic latex (as described above) _ 100
Odorless aliphatic mineral spirits _____ 50
Butyl benzyl phthalate _____ 2.0

(C)

| | Parts |
|---|---|
| Non-film forming acrylic latex (as described above) | 100 |
| Odorless aliphatic mineral spirits | 50 |
| Dimethyl phthalate as a coalescing agent (volatizes from film) | 2.0 |

(D)

| | Parts |
|---|---|
| Non-film forming acrylic latex | 100 |
| Odorless aliphatic mineral spirits | 50 |
| Dimethyl phthalate | 3.0 |

(E)

The same as D except 4.0 parts of dimethyl phthalate are used.

Films formed from these mixtures and dried at room temperature have the following characteristics:

Film A is least continuous of all the films. Films B–D have increased continuity with increasing whiteness. Film E is of generally the same continuity as Film D but is much whiter than D. Film E is continuous and very white.

EXAMPLE XIII

A mixture of 100 parts of the latex of Example VI (55% polymer solids), 17 parts of spray satin clay, 6 parts of $TiO_2$ finely ground pigment, and 40 parts of water is formed. To this mixture is then added with agitation 75 parts non-solvent odorless aliphatic mineral spirits (B.P. range 360° to 380° F.). This final mixture is then applied with a roller and dried to leave a 2 mil. dry film. The resulting film is an opaque white film having discrete voids therein and particles of $TiO_2$ dispersed throughout the polymer matrix and has improved hiding.

EXAMPLE XIV

The same procedure is followed as in Example XIII except in addition to the $TiO_2$, 3 parts on an organic dye known as "Acetosol Blue GLS" are added by initially dispersing them in the odorless aliphatic mineral spirits. The film formed is a pastel blue wherein a substantial portion of the discrete voids are coated with the dye.

EXAMPLE XV

The same procedure is followed as in Example XIII except that antimony oxide is used instead of $TiO_2$, 0.5 part of Geigy brightener Tinopal PCRP (a conventional organic brightener) are added. This brightener is added by dispersing it in the latex system. The resulting film exhibits increased brightness over a film not having the brightener therein.

EXAMPLE XVI

Several latex paint formulations are prepared from a mixture of 200 parts of a latex of good film forming acrylic copolymer latex consisting of 43% methyl methacrylate, 55% butyl acrylate, and 2% methacrylic acid ("Rhoplex AC–388," which contains 50% solids by weight and weighs 8.85 pounds per gallon), 5.5 parts of an octyl phenol polyoxyethylene non-ionic surfactant; 40 parts of a brittle water soluble acrylic dispersant having 25% solids by weight, 4.0 parts of an antifoam agent, 0.5 part of a mercuric type fungicide, 0.3 part of amine stabilizer and 165 parts of a thickener consisting of a 3% solution of hydroxyethylcellulose. The entire mixture is thoroughly mixed by agitation. Rutile titanium dioxide and a liquid non-solvent for the copolymer consisting of high flash aliphatic naphtha (B.P. range 450° to 500° F.) are added to each of the mixtures while stirring in the amounts shown in the table below. After the addition of pigment and non-solvent to each one of the samples to be tested the total volume of each formulation is brought to a fixed volume of 100 gallons by the addition of hydroxyethylcellulose thickener solution and water in such a proportion as to attain a uniform viscosity of 85 to 95 Krebs units in each of the formulations shown in the table. Each of the formulations is drawn as a film using a 2 mil Bird applicator and dried at room temperature. The resulting films are thereafter evaluated by measuring their respective contrast ratios. The contrast ratio of a paint compares the percent total reflectance over a black substrate with the percent total reflectance over a white substrate. A value of 100% signifies complete hiding of the black substrate. The figures in the following table represent the contrast ratio for the formulation which contains the designed quantity of non-solvent and rutile titanium dioxide pigment.

TABLE E

| $TiO_2$ (parts by weight) | Non-solvent (parts by weight) | | | | |
|---|---|---|---|---|---|
| | 0.0 | 50.0 | 100.0 | 150.0 | 200.0 |
| | Contrast ratios, percent | | | | |
| 0.0 | 3.0 | 43.8 | 53.3 | 64.7 | 73.0 |
| 50.0 | 73.0 | | 85.0 | | 90.6 |
| 100.0 | 84.3 | 92.6 | | 94.2 | |
| 150.0 | 90.3 | | 94.8 | | 97.4 |
| 200.0 | 90.8 | 95.2 | | 97.1 | |

It can be readily seen from the foregoing table that superior results are attained in adding a non-solvent having a low volatility. It can also be observed that by adding both pigment and non-solvent to the latex formulation a synergistic effect is obtained whereby far superior hiding is achieved. It can also be seen from the foregoing table that considerable hiding is obtained in the film containing no $TiO_2$. For example, by adding 200 parts of the low volatile non-solvent results in a film having a same hiding as a prior art film with 50 parts by weight $TiO_2$. Also, the combination of 50 parts of $TiO_2$ and 200 parts of non-solvent yields more hiding power than 150 parts of $TiO_2$ without the non-solvent and almost as much as 200 parts by weight of $TiO_2$.

EXAMPLE XVII

The same procedure is followed as in Example XVI except that a fixed quantity of phthalocyanine green pigment is added to each as a tint. The resulting films are evaluated in the manner described in Example XVIII, except that the "Tint Strength" values are measured. Tint strength is the ability of white pigments to hide colorants and this measurement leads to a direct measurement of opacity in paint films. Thus, a paint with 200% tint strength requires twice as much colorant to attain the same deepness of color as one with 100% tint strength. In other words, the paint having a 200% tint strength hides the tint (colorant) much more and is therefore much more opaque than a paint having a tint strength of 100%. The figures in the following table represent the tint strength for each formulation which contains the designated quantity of non-solvent and rutile titanium dioxide pigment. The tint strength values are based on a composition containing 100 parts by weight of $TiO_2$ without any non-solvent added thereto.

TABLE F

| $TiO_2$ (parts by weight) | Non-solvent (parts by weight) | | | | |
|---|---|---|---|---|---|
| | 0.0 | 50.0 | 100.0 | 150.0 | 200.0 |
| | Tint strengths, percent | | | | |
| 0.0 | 6.2 | 11.5 | 21.0 | 30.0 | 37.0 |
| 50.0 | 59.4 | | 98.0 | | 133.0 |
| 100.0 | ¹ 100.0 | 151.0 | | 207.0 | |
| 150.0 | 124.0 | | 205.0 | | 314.0 |
| 200.0 | 143.0 | 243.0 | | 320.0 | |

¹ Basis.

It can be seen from the foregoing table that when 200 parts of non-solvent are added to the formulation without any $TiO_2$ added as an opacifying agent, the resulting film hides up to the equivalent of over 30 parts of $TiO_2$. Furthermore, it can be seen that by the addition of 100 parts of $TiO_2$ and 50 parts of the low volatile non-solvent the resulting paint has a tint strength which is greater than the paint having 200 parts of $TiO_2$ and no non-solvent. Also, the formulation which has 50 parts of $TiO_2$ and 100 parts of non-solvent is essentially equivalent to the formulation having 100 parts by weight of $TiO_2$ and no non-solvent.

The synergistic effects of the non-solvent of this invention are clearly indicated by the foregoing table, since even 200 parts of non-solvent contributes 37% tint strength without $TiO_2$ added to the formulation, and at each $TiO_2$ level seen 50 parts by weight of non-solvent generates at least an increase of 50 to 100% in tint strength. At the 200 parts of non-solvent level utilizing 150 parts of $TiO_2$ in the formulation, the non-solvent (the void forming agent) contributes a 190% increase in tint strength, i.e., 314% vs. 124%.

EXAMPLE XVIII

The same procedure is followed as in Example XVI except that only 3 parts by weight of brittle water soluble acrylic dispersant (25% solids by weight) are used instead of 40 parts by weight. The contrast ratios of the paints having the formulations as designated are set forth in the following table. Each of the paints films evaluated were applied using a 2 mil Bird applicator.

TABLE G

| $TiO_2$ (parts by weight) | Non-solvent (parts by weight) | | | |
|---|---|---|---|---|
| | 0.0 | 50.0 | 100.0 | 150.0 |
| | Contrast ratio, percent | | | |
| 0.0 | 3.1 | 4.2 | 30.4 | 14.9 |
| 50.0 | 70.0 | | 85.0 | |
| 100.0 | 82.0 | 87.0 | | 90.0 |
| 150.0 | 87.0 | | 93.0 | |
| 200.0 | 88.0 | 94.0 | | 96.0 |

EXAMPLE XIX

The same procedure is followed as in Example XVII except that only 3 parts by weight of brittle water soluble acrylic dispersant are used instead of 40 parts by weight. The tint strengths of the paints having the formulations as designated are set forth in the following table.

TABLE H

| $TiO_2$ (parts by weight) | Non-solvent (parts by weight) | | | |
|---|---|---|---|---|
| | 0.0 | 50.0 | 100.0 | 150.0 |
| | Tint strengths, percent | | | |
| 0.0 | 4.7 | 8.6 | 8.2 | 6.9 |
| 50.0 | 62.0 | | 104.0 | |
| 100.0 | 100.0 | 142.0 | | 162.0 |
| 150.0 | 124.0 | | 221.0 | |
| 200.0 | 151.0 | 247.0 | | 315.0 |

The results observed in Examples XVIII and XIX reveal that the contrast ratios for the $TiO_2$ free systems are very low, i.e., 3.1% to 30.4% and the tint strengths for these materials are from 4.7% to 8.2%. However, when a level of 100 parts by weight of $TiO_2$ and 50 parts by weight of non-solvent are incorporated in the formulation, it can be seen that the non-solvent generates 42% of the tint strength. At a level of 200 parts of $TiO_2$ and 50 parts of non-solvent, the void forming non-solvent generates almost a 100% tint strength improvement over the paint which has been formulated without any non-solvent. Thus, a pure synergistic effect is demonstrated. In both Examples XVIII and XIX it can be seen that when 200 parts of $TiO_2$ are used along with 100 parts of latex solids, the additional 100 parts of $TiO_2$ is much less efficient than the first 100 parts of $TiO_2$. However, it can also be observed that from the foregoing tables that when 50 parts of non-solvent are placed in the paint formulation, the tint strength is increased by about 100% instead of by 50% as when no non-solvent is employed.

I claim:
1. A method of producing films having enhanced opacity and hiding which comprises:
 (A) applying to a substrate a latex composition comprising,
  (i) an aqueous continuous phase containing dispersed therein a film-forming binder consisting essentially of substantially water insoluble particles of non-elastomeric coalescable polymer;
  (ii) a volatile non-solvent for said coalescable polymer which is present in a weight ratio of non-solvent to polymer solids of from about 0.05 to about 3:1, said non-solvent being of sufficiently low volatility as to be capable of producing a continuous, non-porous, microcellular and opaque film having minute, discrete and substantially closed voids; and
  (iii) an opacifying pigment which is present in a weight ratio of pigment to polymer solids of from about 0.1 to about 5:1;
 (B) evaporating water from the applied mixture and maintaining the applied mixture at a temperature above about the minimum film-forming temperature of said binder until said binder coalesces to form a film in which minute droplets of said non-solvent are entrapped and said film is in a tack-free state; and
 (C) thereafter evaporating said non-solvent to thereby provide a non-porous film having a plurality of small closed microcellular voids in the film.
2. A method according to claim 1 wherein said latex composition contains less than about 25 volume percent of non-volatiles.
3. A method according to claim 2 wherein said non-solvent is a liquid aliphatic hydrocarbon which substantially boils above about 400° F.
4. A method according to claim 1 wherein said coalescable polymer is selected from the group consisting of acrylic polymers, copolymers of vinyl acetate with a minor amount of ester of an unsaturated acid, and copolymers of vinyl aromatic hydrocarbons with alkyl acrylates or dienes.
5. A method according to claim 1 wherein said latex composition contains an additive at least one fungicide, mildewcide, surfactant, flow modifier, thickener, free flow stabilizer, anti-skin agent, anti-flocculant, or pH stabilizer.
6. A method according to claim 1 wherein a dye is dissolved in the non-solvent and the non-solvent is removed to thereby distribute the dye on the internal surfaces of the voids.
7. A method according to claim 1 which includes the step of dispersing pigment particles within the film.
8. A method according to claim 7 wherein said pigment is a member selected from the group consisting of $TiO_2$ and $Sb_2O_3$.
9. A method according to claim 7 wherein the pigment particles are located in the polymer matrix of said film by dispersing the pigment particles in the water phase of said latex.
10. A method according to claim 7 including the steps of dispersing said pigment particles in the non-solvent liquid and removing the non-solvent liquid to thereby distribute said particles within said minute voids.
11. A method according to claim 1 which includes the step of dispersing a member selected from the group consisting of fluorescent materials, optical brighteners and mixtures thereof within the film.
12. A method according to claim 1 wherein the non-solvent liquid is miscible with water.
13. A method according to claim 1 wherein the non-solvent liquid is immiscible with water.
14. A product made by the process of claim 1.
15. A product made by the process of claim 6.
16. A product made by the process of claim 9.
17. A product made by the process of claim 10.

(References on following page)

References Cited

UNITED STATES PATENTS

| | | | |
|---|---|---|---|
| 2,961,334 | 9/1961 | Clancy et al. | 117—161 X |
| 3,079,837 | 3/1963 | Theilemann | 117—161 X |
| 3,347,814 | 10/1967 | Hatala | 117—161 X |
| 3,092,601 | 5/1963 | Sullivan et al. | 117—161 X |
| 3,083,124 | 3/1963 | Rahmes | 117—161 X |
| 3,366,590 | 1/1968 | Taft | 117—161 X |
| 3,370,024 | 2/1968 | Grasko et al. | 117—161 X |
| 3,445,272 | 5/1969 | Newton | 117—161 X |
| 2,259,746 | 10/1941 | Goff et al. | |
| 2,739,909 | 3/1956 | Rosenthal. | |
| 2,961,334 | 11/1960 | Clancy et al. | |
| 3,108,009 | 10/1963 | Clancy et al. | |
| 3,157,533 | 11/1964 | Clancy et al. | |
| 3,544,489 | 12/1970 | Dowbenko et al. | |

FOREIGN PATENTS 868,579  5/1961  Great Britain.

WILLIAM D. MARTIN, Primary Examiner

MATHEW R. P. PERRONE, JR., Assistant Examiner

U.S. Cl. X.R.

117—36.7, 161 UB, 161 UC, 161 UD, 161 UE, 161 UF, 161 UH, 161 UN, 161 UF; 260—29.6 R, 29.6 B, 29.6 PM